(12) United States Patent
Etchegoyen

(10) Patent No.: US 10,402,893 B2
(45) Date of Patent: Sep. 3, 2019

(54) SYSTEM AND METHOD FOR PREVENTING MULTIPLE ONLINE PURCHASES

(71) Applicant: Uniloc Luxembourg S.A., Luxembourg (LU)

(72) Inventor: Craig S. Etchegoyen, Plano, TX (US)

(73) Assignee: Uniloc 2017 LLC, Wilmington, DE (US)

( * ) Notice: Subject to any disclaimer, the term of this patent is extended or adjusted under 35 U.S.C. 154(b) by 0 days.

(21) Appl. No.: 13/961,774

(22) Filed: Aug. 7, 2013

(65) Prior Publication Data
US 2013/0325527 A1    Dec. 5, 2013

Related U.S. Application Data

(63) Continuation of application No. 12/792,442, filed on Jun. 2, 2010, now Pat. No. 10,068,282.

(60) Provisional application No. 61/220,099, filed on Jun. 24, 2009.

(51) Int. Cl.
| | |
|---|---|
| *G06Q 30/06* | (2012.01) |
| *G06Q 10/02* | (2012.01) |
| *G06Q 30/00* | (2012.01) |

(52) U.S. Cl.
CPC ......... *G06Q 30/0637* (2013.01); *G06Q 10/02* (2013.01); *G06Q 30/00* (2013.01); *G06Q 30/06* (2013.01); *G06Q 30/0601* (2013.01)

(58) Field of Classification Search
CPC .............................................. G06Q 30/0637
See application file for complete search history.

(56) References Cited

U.S. PATENT DOCUMENTS

| | | |
|---|---|---|
| 4,351,982 A | 9/1982 | Miller et al. |
| 4,658,093 A | 4/1987 | Hellman et al. |
| 4,704,610 A | 11/1987 | Smith et al. |
| 4,796,220 A | 1/1989 | Wolfe |

(Continued)

FOREIGN PATENT DOCUMENTS

| | | |
|---|---|---|
| AU | 678985 | 6/1997 |
| EP | 1 637 958 | 3/2006 |

(Continued)

OTHER PUBLICATIONS

Lambert, Steve, "High-tech scalpers beat fans in online rush for tickets to popular shows," The Canadian Press, Canadian Press Enterprises Inc., Toronto, Sep. 10, 2008.*

(Continued)

*Primary Examiner* — Nathan Erb
(74) *Attorney, Agent, or Firm* — Sean D. Burdick

(57) ABSTRACT

A method for preventing redundant purchases of limited items includes steps for providing a commerce client to a user, receiving (a) financial information of the user and (b) a device identifier from a device the user is using to run the commerce client, the device identifier being based on one or more of user-configurable and non-user-configurable parameters of the user device, determining whether a previous transaction has been made with the device associated with the received device identifier, and disallowing the device from executing further transactions for a predetermined period of time. The method may be executed by an apparatus such as a computer server or stored as a series of instructions on a computer readable medium.

17 Claims, 4 Drawing Sheets

(56) References Cited

U.S. PATENT DOCUMENTS

| | | | |
|---|---|---|---|
| 4,956,863 A * | 9/1990 | Goss | 380/30 |
| 5,113,518 A * | 5/1992 | Durst, Jr. | G06F 21/12 |
| | | | 726/29 |
| 5,210,795 A | 5/1993 | Lipner et al. | |
| 5,291,598 A | 3/1994 | Grundy | |
| 5,343,529 A * | 8/1994 | Goldfine | G06F 21/31 |
| | | | 340/5.5 |
| 5,414,269 A | 5/1995 | Takahashi | |
| 5,418,854 A | 5/1995 | Kaufman et al. | |
| 5,440,635 A | 8/1995 | Bellovin et al. | |
| 5,490,216 A * | 2/1996 | Richardson, III | G06F 21/10 |
| | | | 705/59 |
| 5,666,415 A | 9/1997 | Kaufman | |
| 5,745,879 A | 4/1998 | Wyman | |
| 5,754,763 A | 5/1998 | Bereiter | |
| 5,790,664 A | 8/1998 | Coley et al. | |
| 5,925,127 A | 7/1999 | Ahmad | |
| 5,974,150 A | 10/1999 | Kaish et al. | |
| 6,009,525 A | 12/1999 | Horstmann | |
| 6,026,166 A | 2/2000 | LeBourgeois | |
| 6,044,471 A | 3/2000 | Colvin | |
| 6,148,407 A | 11/2000 | Aucsmith | |
| 6,158,005 A | 12/2000 | Bharathan et al. | |
| 6,230,199 B1 | 5/2001 | Revashetti et al. | |
| 6,233,567 B1 | 5/2001 | Cohen | |
| 6,243,468 B1 | 6/2001 | Pearce et al. | |
| 6,294,793 B1 | 9/2001 | Brunfeld et al. | |
| 6,330,670 B1 | 12/2001 | England et al. | |
| 6,449,645 B1 | 9/2002 | Nash | |
| 6,535,469 B1 * | 3/2003 | Heylen | G11B 7/00375 |
| | | | 369/47.21 |
| 6,536,005 B1 | 3/2003 | Augarten | |
| 6,671,674 B1 | 12/2003 | Anderson et al. | |
| 6,785,825 B2 | 8/2004 | Colvin | |
| 6,859,793 B1 | 2/2005 | Lambiase | |
| 6,910,072 B2 | 6/2005 | Macleod Beck et al. | |
| 6,920,567 B1 | 7/2005 | Doherty et al. | |
| 6,948,064 B2 | 9/2005 | Smith, Sr. et al. | |
| 6,976,009 B2 | 12/2005 | Tadayon et al. | |
| 7,032,110 B1 | 4/2006 | Su et al. | |
| 7,069,440 B2 | 6/2006 | Aull | |
| 7,069,595 B2 | 6/2006 | Cognigni et al. | |
| 7,080,049 B2 | 7/2006 | Truitt et al. | |
| 7,085,741 B2 | 8/2006 | Lao et al. | |
| 7,089,425 B2 | 8/2006 | Chan | |
| 7,188,241 B2 | 3/2007 | Cronce et al. | |
| 7,203,966 B2 | 4/2007 | Abburi et al. | |
| 7,206,765 B2 | 4/2007 | Gilliam et al. | |
| 7,272,728 B2 | 9/2007 | Pierson et al. | |
| 7,319,987 B1 | 1/2008 | Hoffman et al. | |
| 7,327,280 B2 | 2/2008 | Bachelder et al. | |
| 7,337,147 B2 | 2/2008 | Chen et al. | |
| 7,343,297 B2 | 11/2008 | Bergler et al. | |
| 7,463,945 B2 | 12/2008 | Kiesel et al. | |
| 7,475,044 B1 | 1/2009 | Kawai et al. | |
| 7,523,860 B2 | 4/2009 | Bonelle et al. | |
| 7,539,869 B1 | 5/2009 | Mullan et al. | |
| 7,653,899 B1 | 1/2010 | Lindahl et al. | |
| 7,885,899 B1 | 2/2011 | Sancho | |
| 8,452,974 B2 | 5/2013 | Sakumoto | |
| 8,582,838 B1 | 11/2013 | McCormick et al. | |
| 8,661,252 B2 | 2/2014 | Chandwani | |
| 9,779,556 B1 * | 10/2017 | Thobhani | G07B 17/00733 |
| 10,068,282 B2 * | 9/2018 | Etchegoyen | G06Q 10/02 |
| 2001/0034712 A1 | 10/2001 | Colvin | |
| 2001/0044782 A1 | 11/2001 | Hughes et al. | |
| 2002/0019814 A1 | 2/2002 | Ganesan | |
| 2002/0029185 A1 | 3/2002 | Tanaka et al. | |
| 2002/0055906 A1 | 5/2002 | Katz et al. | |
| 2002/0062276 A1 | 5/2002 | Krueger et al. | |
| 2002/0082997 A1 | 6/2002 | Kobata et al. | |
| 2002/0099649 A1 | 7/2002 | Lee et al. | |
| 2002/0161718 A1 | 10/2002 | Coley et al. | |
| 2003/0026404 A1 | 2/2003 | Joyce et al. | |
| 2003/0065918 A1 | 4/2003 | Wiley | |
| 2003/0116621 A1 | 4/2003 | Duncan | |
| 2003/0097331 A1 | 5/2003 | Cohen | |
| 2003/0172035 A1 | 9/2003 | Cronce et al. | |
| 2003/0218629 A1 | 11/2003 | Terashima et al. | |
| 2004/0024860 A1 | 2/2004 | Sato et al. | |
| 2004/0030912 A1 | 2/2004 | Merkle et al. | |
| 2004/0059929 A1 | 3/2004 | Rodgers et al. | |
| 2004/0103297 A1 * | 5/2004 | Risan | G06F 21/10 |
| | | | 726/27 |
| 2004/0143746 A1 | 7/2004 | Ligeti et al. | |
| 2004/0187018 A1 | 9/2004 | Owen et al. | |
| 2004/0205015 A1 | 10/2004 | DeLaCruz et al. | |
| 2005/0172280 A1 | 4/2005 | Ziegler et al. | |
| 2005/0097366 A1 | 5/2005 | McCreight et al. | |
| 2005/0108173 A1 | 5/2005 | Stefik et al. | |
| 2005/0108177 A1 | 5/2005 | Sancho | |
| 2005/0138155 A1 | 6/2005 | Lewis | |
| 2006/0095454 A1 | 5/2006 | Shankar et al. | |
| 2006/0161914 A1 | 7/2006 | Morrison et al. | |
| 2006/0179319 A1 * | 8/2006 | Krawczyk | G06Q 20/3678 |
| | | | 713/180 |
| 2006/0229993 A1 | 10/2006 | Cole | |
| 2006/0265337 A1 | 11/2006 | Wesinger, Jr. | |
| 2006/0282511 A1 | 12/2006 | Takano et al. | |
| 2007/0027792 A1 | 2/2007 | Smith | |
| 2007/0061590 A1 | 3/2007 | Boye et al. | |
| 2007/0113090 A1 | 5/2007 | Villela | |
| 2007/0168288 A1 | 7/2007 | Bozeman | |
| 2007/0169181 A1 | 7/2007 | Roskind | |
| 2007/0198422 A1 | 8/2007 | Prahlad et al. | |
| 2007/0203846 A1 | 8/2007 | Kavuri et al. | |
| 2007/0219917 A1 | 9/2007 | Liu et al. | |
| 2007/0235525 A1 * | 10/2007 | Murch | 235/382 |
| 2007/0239606 A1 * | 10/2007 | Eisen | G06Q 20/3674 |
| | | | 705/51 |
| 2007/0282615 A1 | 12/2007 | Hamilton et al. | |
| 2008/0065552 A1 | 3/2008 | Elazar et al. | |
| 2008/0086423 A1 | 4/2008 | Waites | |
| 2008/0120229 A1 | 5/2008 | Patil et al. | |
| 2008/0134347 A1 * | 6/2008 | Goyal | G06F 21/6209 |
| | | | 726/29 |
| 2008/0147556 A1 | 6/2008 | Smith et al. | |
| 2008/0183622 A1 | 7/2008 | Dixon et al. | |
| 2008/0228578 A1 | 9/2008 | Mashinsky | |
| 2008/0320607 A1 | 12/2008 | Richardson | |
| 2009/0083730 A1 | 3/2009 | Richardson | |
| 2009/0119134 A1 | 5/2009 | Sakaue | |
| 2009/0138975 A1 | 5/2009 | Richardson | |
| 2009/0172402 A1 | 7/2009 | Tran | |
| 2009/0198618 A1 | 8/2009 | Chan et al. | |
| 2010/0131366 A1 * | 5/2010 | Gibson | G06Q 30/02 |
| | | | 705/14.58 |
| 2010/0250949 A1 | 9/2010 | Torino et al. | |
| 2010/0332337 A1 | 12/2010 | Bullock | |
| 2011/0270694 A1 | 11/2011 | Halim | |
| 2012/0030771 A1 * | 2/2012 | Pierson et al. | 726/26 |
| 2012/0078668 A1 * | 3/2012 | Hirose | G06Q 10/02 |
| | | | 705/5 |

FOREIGN PATENT DOCUMENTS

| | | |
|---|---|---|
| EP | 1 637 961 | 3/2006 |
| EP | 1 670 188 | 6/2006 |
| WO | WO 1992/020022 | 11/1992 |
| WO | WO 1993/001550 | 1/1993 |
| WO | WO 1995/035533 | 12/1995 |
| WO | WO 2000/067095 | 11/2000 |
| WO | WO 2005/104686 | 11/2005 |
| WO | WO 2007/060516 | 5/2007 |
| WO | WO 2008/157639 | 6/2007 |
| WO | WO 2008/013504 | 1/2008 |
| WO | WO 2009/039504 | 3/2009 |
| WO | WO 2009/065135 | 5/2009 |
| WO | WO 2009/076232 | 6/2009 |
| WO | WO 2009/105702 | 8/2009 |

(56) References Cited

FOREIGN PATENT DOCUMENTS

| WO | WO 2009/143115 | 11/2009 |
|----|----------------|---------|
| WO | WO 2009/158525 | 12/2009 |

OTHER PUBLICATIONS

Angha et al.; "Securing Transportation Network Infrastructure with Patented Technology of Device Locking—Developed by Uniloc USA", http://www.dkassociates.com/admin/paperfile/ITS%20World%20Paper%20Submission_Uniloc%20_2_.pdf; Oct. 24, 2006.

Choudhary et al., "A Cross-browser Web Application Testing Tool," 26th IEEE International Conference on Software Maintenance, Issue Date Sep. 12-18, 2010.

Park et al., "Web Server for Web Page Fingerprinting," *Granular Computing*, IEEE International Conference on Aug. 26-28, 2008.

Econolite; Econolite and Uniloc Partner to Bring Unmatched Infrastructure Security to Advanced Traffic Control Networks with Launch to StrongPoint; http://www.econolite.com/docs/press/20080304_Econolite_StronPoint.pdf; Mar. 4, 2008.

Smolens et al., "Detecting Emerging Wearout Faults," In *Proceedings of the IEEE Workshop on Silicon Errors in Logic—System Effects*, Apr. 2007, Internet Article retrieved on Sep. 30, 2010. XP002603491.

Wikipedia: "Software Extension," May 28, 2009, Internet Article retrieved on Oct. 11, 2010. XP002604710.

H. Williams, et al., "Web Database Applications with PHP & MySQL", Chapter 1, "Database Applications and the Web", ISBN 0-596-00041-3, O'Reilly & Associates, Inc., Mar. 2002, avail. at: http://docstore.mik.ua/orelly/webprog/webdb/ch01_01.htm. XP002603488.

Williams, R., "A Painless Guide to CRC Error Detection Algorithms," Aug. 13, 1993, 33 pages, www.ross.net/crc/download/crc_v3.txt.

Watt, Peggy, "Prolok Signs Up Tandy," *InfoWorld Magazine*, Mar. 23, 1984, p. 14.

Guo et al., "Integrating Web Content Clustering in Web Log Association Rule Mining," *Lecture Notes in Artificial Intelligence 3501*, © Springer-Verlag, Berlin Heidelberg, 2005, pp. 182-193.

\* cited by examiner

SYSTEM AND METHOD FOR PREVENTING MULTIPLE ONLINE PURCHASES

This application is a continuation of U.S. patent application Ser. No. 12/792,442 filed on Jun. 2, 2010, which claims priority to U.S. Provisional Application 61/220,099 filed on Jun. 24, 2009, both of which applications are fully incorporated herein by reference.

BACKGROUND

Field of the Invention

The present invention is directed toward a method and system for controlling multiple purchases of an item of commerce by a single client device.

Description of the Related Art

Certain items of commerce are limited in supply such as tickets to sporting events, concerts, theatrical plays, movies tickets, performing arts, etc. If an event is rare and tickets to the event are limited, a person may be tempted to hoard as many tickets as possible. The hoarding of these event tickets allows unscrupulous people to profit from the limited supply of these tickets while robbing others of opportunities to purchase the tickets and attend the event. Today, most tickets are sold over the Internet. This makes it easy for consumers to purchase tickets. However, the Internet has also made it easy for people to hoard tickets and resell them later for profit when the supply of those tickets has diminished. Accordingly, it is desirable to provide a system and method for preventing a person from making excessive purchases of a limited item, such as event tickets or the like.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with a system for preventing multiple purchases of limited items, the method comprising: providing a commerce client to a user; receiving a financial information of the user and a device identifier from a device the user is using to run the commerce client, the device identifier being based on one or more of at user-configurable and non-user-configurable parameters of the user device; determining whether a previous transaction has been made with the device having the received device identifier; and disallowing the device from executing further transaction for a predetermined period of time.

The commerce client provided to the user is configured to allow the user device to perform a commercial transaction with an online commerce server. The commerce client may be an application configured to work with the user's web browsers. Alternatively, the commerce client may be a standalone application. The commerce client allows the user device to make purchases with the remote server or the online commerce server by generating and sending a device identifier to the online commerce server as required. The commerce server may be configured to sell event tickets, goods, or services.

For example, the limited items may comprise collector items, such as stamps, rare coins, or event tickets, which may include sporting tickets, concert tickets, and theatrical tickets. The commerce client may also be configured to generate and send the device identifier of the user's device to a remote server or the online ticket server.

Once a user has purchased a ticket using a device, the very same device is disallowed from making any further purchase for a predetermined period of time. The time period may be from a time when the first purchase was made to a time when the limited items are no longer available or the event with which the limited item grants entrance has passed. The predetermined period of time where the device is prevented from making further purchases may be an hour, a day, a week, or a month.

The commerce client may be configured to generate a device identifier using a silicon degradation characteristic of a computer chip of the device or at least one of a user-configurable parameter comprises one of hard disk volume name, user name, device name, user password, and hard disk initialization date for the device. The device identifier may be generated using at least one irreversible transformation of the at least one user-configurable parameter and the at least one non-user-configurable parameter of the device.

In accordance with one or more embodiments of the present invention, an apparatus for software activation is described. The apparatus may include: means for providing a commerce client to a user; means for receiving a financial information of the user and a device identifier from a device the user is using to run the commerce client, the device identifier being based on one or more of at user-configurable and non-user-configurable parameters of the user device; means for determining whether a previous transaction has been made with the device having the received device identifier; and means for disallowing the device from executing further transaction for a predetermined period of time.

In accordance with yet another embodiment of the present invention a computer readable medium is provided. The computer readable medium having stored thereon, computer executable instructions that, if executed by a device, cause the device to perform a method comprising: providing a commerce client to a user; receiving a financial information of the user and a device identifier from a device the user is using to run the commerce client, the device identifier being based on one or more of at user-configurable and non-user-configurable parameters of the user device; determining whether a previous transaction has been made with the device having the received device identifier; and disallowing the device from executing further transaction for a predetermined period of time.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention.

DETAILED DESCRIPTION

Figure 1:
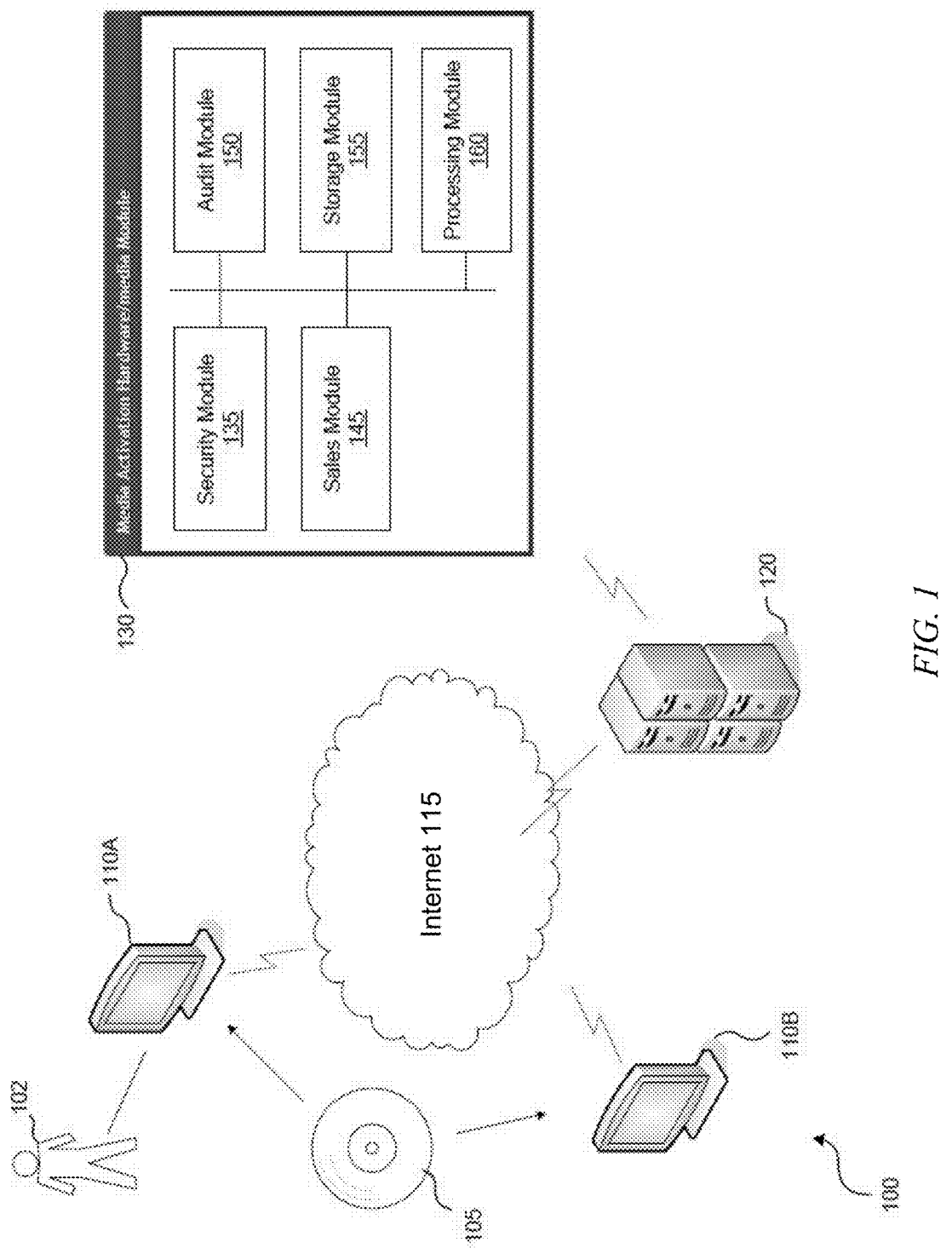
FIG. 1 illustrates an exemplary environment with which a method for restricting multiple online purchases can be implemented according to one embodiment of the present invention.

As mentioned, certain items of commerce are limited in supply such as tickets to sporting events, concerts, theatrical plays, movies tickets, and performing arts. Tickets to certain events are limited in supply. Today, most tickets are sold over the Internet. This makes it easy for consumers to purchase tickets. However, the Internet has also made it easy for people to hoard tickets and to resell them later for profit when the supply of those tickets has diminished. Accordingly, it is desirable to have a system and method for preventing a person from making excessive purchases of a limited item. This may be done by properly identifying a device being used to purchase the tickets. Once the device's identifier has been obtained, the device may be excluded from making further purchases. In this way, a user cannot use the same device to purchase many tickets over and over again.

In one embodiment, the user may be required to install a commerce client onto their device. The commerce client may be an application configured to work with the user's web browsers. Alternatively, the commerce client may be a standalone application. The commerce client allows the user device to make purchases with the remote server or the online commerce server by generating and sending a device identifier to the online commerce server as required. The commerce server may be configured to sell event tickets, goods, or services. Without receiving the device identifier, the online commerce server may deny the user's device from purchasing items from its online store. For example, if a user attempts to make a purchase with a commerce server that requires a device identifier without the commerce client being installed, the commerce server may simply refuse the connection as the expected device identifier is not received.

The commerce server may be configured to receive a device identifier from the commerce client. Additionally, the server may be configured to disallow the user device from interacting with the server if a commerce client is not found on the user's computer or no proper device identifier is received.

During a transaction, the commerce client is configured to obtain financial information of the user and to forward the information to the commerce server. The commerce client is also configured to generate a unique device identifier using one or more of user-configurable and non-user-configurable parameters of the user's device. A detail description on how the commerce client generates the device identifier is provided below. Upon receiving the user's financial information and the device identifier, the commerce client performs a cross reference check to determine whether the device with the received device identifier has recently performed a financial transaction with the commerce server. If a recent transaction is found, the commerce server may determine whether the past transaction is for the same event, good, or service. If the current attempted transaction is the same event, good, or service as the past transaction, then the current transaction is not allowed. If, however, the current transaction is for a different event, then the user's device will be allowed to proceed with the current transaction.

In one embodiment, the device identifier is first generated and sent to the commerce server before the user's financial information is collected. In this way, if the user's device is disqualified from performing a commercial transaction with the commerce server, no time needs to be wasted in collecting the user's financial data.

Before describing the invention in further detail it is useful to describe an example environment with which the invention can be implemented. FIG. 1 is a diagram illustrating an example environment 100 with which the online commerce restriction, system, and apparatus is implemented according to one or more embodiments of the present invention. The illustrated example environment 100 includes a user 102, a storage medium 105, computing devices 110A and 110B, a network 115, a commerce server 120, and a software/hardware module 130. Storage medium 105 may be an optical disc, a memory device (e.g., flash memory), a magnetic storage medium, or other storage device not yet contemplated. Storage medium 105 may comprise the commerce client. Alternatively, the commerce client may be downloaded from the Internet. The commerce client may also be digitally distributed or streamed from one or more servers. Network 115 may comprise the Internet, a local area network, or other form of communication network.

Computing devices 110A-B may be in operative communication with commerce server 120. While only one computing device 110 is illustrated, it will be understood that a given system may comprise any number of computing devices. Computing device 110 may be, but is not limited to, a game console, a personal computer, a server computer, a laptop computer, a tablet computer, a personal digital assistant, a mobile phone, a wireless communication device, an onboard vehicle computer, or any other device capable of communication with a computer network.

Computing device 110 may also a pre-installed commerce client (not shown) that may comprise a stand alone application or an applet running within a web browser on the device 110 (e.g., an applet comprising executable code for a Java Virtual Machine). The commerce client may be embedded in or associated with another software application, including but not limited to the media. For example, the commerce client may be embedded in or associated with a tool bar of a software application, such as, for example, a web browser. The commerce client may prompt the user to register with an online software registration service, or may run in the background with little or no interaction with the user of device 110.

The commerce client may collect information regarding computing device 110 by checking a number of parameters which are expected to be unique to the computing device environment. The parameters checked may include, for example, hard disk volume name, user name, device name, user password, hard disk initialization date, etc. The collected information may include information that identifies the hardware comprising the platform on which the web browser runs, such as, for example, CPU number, or other parameters associated with the firmware in use. The system information may further include system configuration information, such as amount of memory, type of processor, software or operating system serial number, etc.

Based on the collected information, the commerce client may generate a device identifier 224 (see FIG. 2) that is unique to the user's computing device 110. The device identifier 224 may be stored in a hidden directory of the device 110 and/or at a remote location, such as the commerce server 120. The device identifier 224 may incorporate the device's IP address and/or other geo-location code to add another layer of specificity to device's unique identifier.

It is noted that an application (e.g., the commerce client) running on the computing device or otherwise having access to the computing device's hardware and file system may generate a unique device identifier (e.g., device identifier 224) using a process that operates on data indicative of the computing device's configuration and hardware. The device identifier may be generated using a combination of user-configurable and non-user-configurable machine parameters as input to a process that results in the device identifier, which may be expressed in digital data as a binary number. Each machine parameter is data determined by a hardware component, software component, or data component specific to the device that the unique identifier pertains to. Machine parameters may be selected based on the target device system configuration such that the resulting device identifier has a very high probability (e.g., greater than 99.999%) of being unique to the target device. In addition, the machine parameters may be selected such that the device identifier includes at least a stable unique portion up to and including the entire identifier, that has a very high probability of remaining unchanged during normal operation of the target device. Thus, the resulting device identifier should be highly specific, unique, reproducible and stable as a result of properly selecting the machine parameters.

The application for generating the device identifier may also operate on the collected parameters with one or more algorithms to generate the device identifier. This process may include at least one irreversible transformation, such as, for example, a cryptographic hash function, such that the input machine parameters cannot be derived from the resulting device identifier. Each device identifier, to a very high degree of certainty, cannot be generated except by the suitably configured application operating or otherwise having had access to the same computing device for which the device identifier was first generated. Conversely, each identifier, again to a very high degree of certainty, can be successfully reproduced by the suitably configured application operating or otherwise having access to the same computing device on which the identifier was first generated.

The application may operate by performing a system scan to determine a present configuration of the computing device. The application may then select the machine parameters to be used as input for generating the unique device identifier. Selection of parameters may vary depending on the system configuration. Once the parameters are selected, the application may generate the identifier.

Further, generating the device identifier may also be described as generating a device fingerprint and may entail the sampling of physical, non-user configurable properties as well as a variety of additional parameters such as uniquely generated hashes and time sensitive values. Physical device parameters available for sampling may include, for example, unique manufacturer characteristics, carbon and silicon degradation and small device failures.

The process of measuring carbon and silicon degradation may be accomplished by measuring a chip's ability to process complex mathematical computations, and its ability to respond to intensive time variable computations. These processes measure how fast electricity travels through the carbon. Using variable offsets to compensate for factors such as heat and additional stresses placed on a chip during the sampling process allows for each and every benchmark to reproduce the expected values. During a standard operating lifetime, the process of passing electricity through the various switches causes a computer chip to degrade. These degradations manifest as gradually slower speeds that extend the processing time required to compute various benchmarking algorithms.

In addition to the chip benchmarking and degradation measurements, the process for generating a device identifier may include measuring physical, non-user-configurable characteristics of disk drives and solid state memory devices. Each data storage device has a large variety of damage and unusable data sectors that are nearly unique to each physical unit. The ability to measure and compare values for damaged sectors and data storage failures provides a method for identifying storage devices.

Device parameter sampling, damage measurement and chip benchmarking make up just a part of device fingerprinting technologies described herein. These tools may be further extended by the use of complex encryption algorithms to convolute the device identifier values during transmission and comparisons. Such encryption processes may be used in conjunction with random sampling and key generations.

The device identifier may be generated by utilizing machine parameters associated with one or more of the following: machine model; machine serial number; machine copyright; machine ROM version; machine bus speed; machine details; machine manufacturer; machine ROM release date; machine ROM size; machine UUID; and machine service tag.

The device identifier may also be generated by utilizing machine parameters associated with one or more of the following: CPU ID; CPU model; CPU details; CPU actual speed; CPU family; CPU manufacturer; CPU voltage; and CPU external clock.

The device identifier may also be generated by utilizing machine parameters associated with one or more of the following: memory model; memory slots; memory total; and memory details.

The device identifier may also be generated by utilizing machine parameters associated with one or more of the following: video model; video details; display model; display details; audio model; and audio details.

The device identifier may also be generated by utilizing machine parameters associated with one or more of the following: network model; network address; Bluetooth address; Blackbox model; Blackbox serial; Blackbox details; Blackbox damage map; Blackbox volume name; NetStore details; and NetStore volume name.

The device identifier may also be generated by utilizing machine parameters associated with one or more of the following: optical model; optical serial; optical details; keyboard model; keyboard details; mouse model; mouse details; printer details; and scanner details.

The device identifier may also be generated by utilizing machine parameters associated with one or more of the following: baseboard manufacturer; baseboard product name; baseboard version; baseboard serial number; and baseboard asset tag.

The device identifier may also be generated by utilizing machine parameters associated with one or more of the following: chassis manufacturer; chassis type; chassis version; and chassis serial number.

The device identifier may also be generated by utilizing machine parameters associated with one or more of the following: IDE controller; SATA controller; RAID controller; and SCSI controller.

The device identifier may also be generated by utilizing machine parameters associated with one or more of the following: port connector designator; port connector type; port connector port type; and system slot type.

The device identifier may also be generated by utilizing machine parameters associated with one or more of the following: cache level; cache size; cache max size; cache SRAM type; and cache error correction type.

The device identifier may also be generated by utilizing machine parameters associated with one or more of the following: fan; PCMCIA; modem; portable battery; tape drive; USB controller; and USB hub.

The device identifier may also be generated by utilizing machine parameters associated with one or more of the following: device model; device model IMEI; device model IMSI; and device model LCD.

The device identifier may also be generated by utilizing machine parameters associated with one or more of the following: wireless 802.11; webcam; game controller; silicon serial; and PCI controller.

Figure 2:
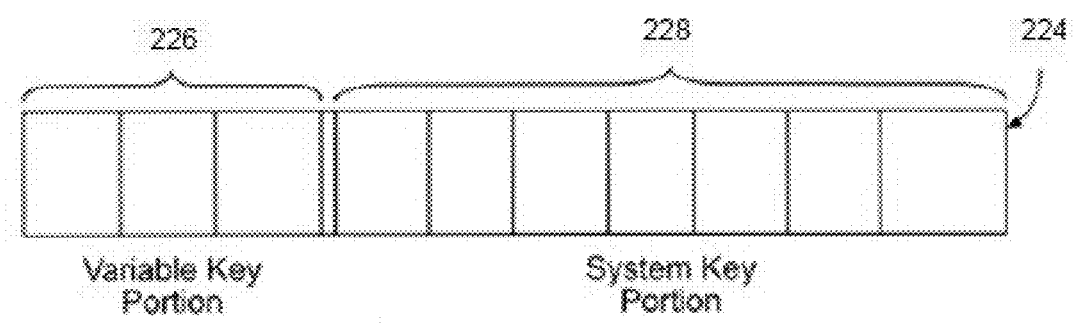
FIG. 2 illustrates the components of an exemplary device identifier.

With reference to FIG. 2, in one embodiment, the device identifier 224 may include two components—namely, a variable key portion 226 and a system key portion 228. The variable key portion 226 may be generated at the time of registration of computing device 110 by reference to a variable platform parameter, such as via reference to system time information, although other parameters which are variable may be utilized in other embodiments. The system key portion 228 may include the above described parameters expected to be unique to the device 110, such as, for example, hard disk volume name, user name, computer name, user password, hard disk initialization date, or combinations thereof. Portions 226 and/or 228 may be combined with the IP address and/or other platform parameters of the device 110. It is noted that device identifiers, or portions thereof, may be encrypted to add an additional layer of specificity and security.

Referring again to FIG. 1, commerce server 120 may comprise a commerce management module 130, which may include a security module 135, a license module 140, a sales module 145, an audit module 150, a storage module 155, and a processing module 160. Security module 135 may be configured to authenticate device identifier 224 received from the commerce client on computing device 110. Sales module 145 may authenticate user's 102 financial data such as credit or debit card number, address, and membership number, if applicable. In one embodiment, device identifier 224 can be used as the membership number.

Security module 135 may also check for information which is expected to be unique to the item of commerce, such as, for example, the event name, location, and date. The item of commerce may include event tickets, goods, and services. The collected item of commerce identifier ("transaction identifier") may include information regarding where the item of commerce was sold or distributed, who the buyers, sellers, and/or distributors were, etc.

The commerce client of computing device 110 may also include a registration routine that collects or receives information regarding the geo-location code of the device 110. A geo-locater (not shown) may comprise the IP address or the like of the device 110.

The commerce client may electronically send device identifier 224 and financial information to commerce server 120. In the alternative, or in addition, a geo-location code, such as the IP address of the device 110, may be associated with the device identifier 224 may sent to the commerce server 120, such as via a secured network connection. The commerce server 120 may encrypt and store the data, such as the device identifier 224 and/or the geo-location code received from the computing device 110. Commerce server 120 may also receive such data from a plurality of computing devices and store the received data in storage module 155. Commerce server 120 may also generate a transaction identifier for the event or item of commerce the user is seeking to purchase. In one embodiment, the transaction identifier is transmitted to the commerce client for auditing purposes.

In one embodiment, the audit module 150 may generate an audit number by associating the transaction identifier with device identifier 224 and/or the geo-location code, and stores the generated audit number in storage module 155.

In one embodiment, commerce client of device 110 may send the device identifier 224 and/or the geo-location code to the server 120 in a piecemeal manner. The server 120 may in turn generate the audit number 142. Commerce server 120 may receive or generate audit numbers from a plurality of computing devices and store the received audit numbers in the storage module 155.

It is noted that the audit number may be generated from device identifier 224, the transaction identifier, and/or the geo-location code via any number of suitable approaches. For example, the transaction identifier may be concatenated or linked with device identifier 224 and/or the geo-location code. It is also noted that the audit number may be stored in a hidden directory of computing device 110 and/or at a remote location, such as the commerce server 120. It is further noted that device identifier 224, the transaction identifier, and/or the geo-location code may be extracted from the audit number 142 at a later time.

Audit module 150 may be configured to keep track of all sales and purchases of event tickets, goods, and services. Audit module 150 may record each purchase of the event tickets, goods, and services. Audit module 150 may also record the purchase date, purchase price, event/good/service identifier, user's 405 financial data, device identifier, etc. Audit module 150 may store the colleted data it in storage module 155.

Figure 3:
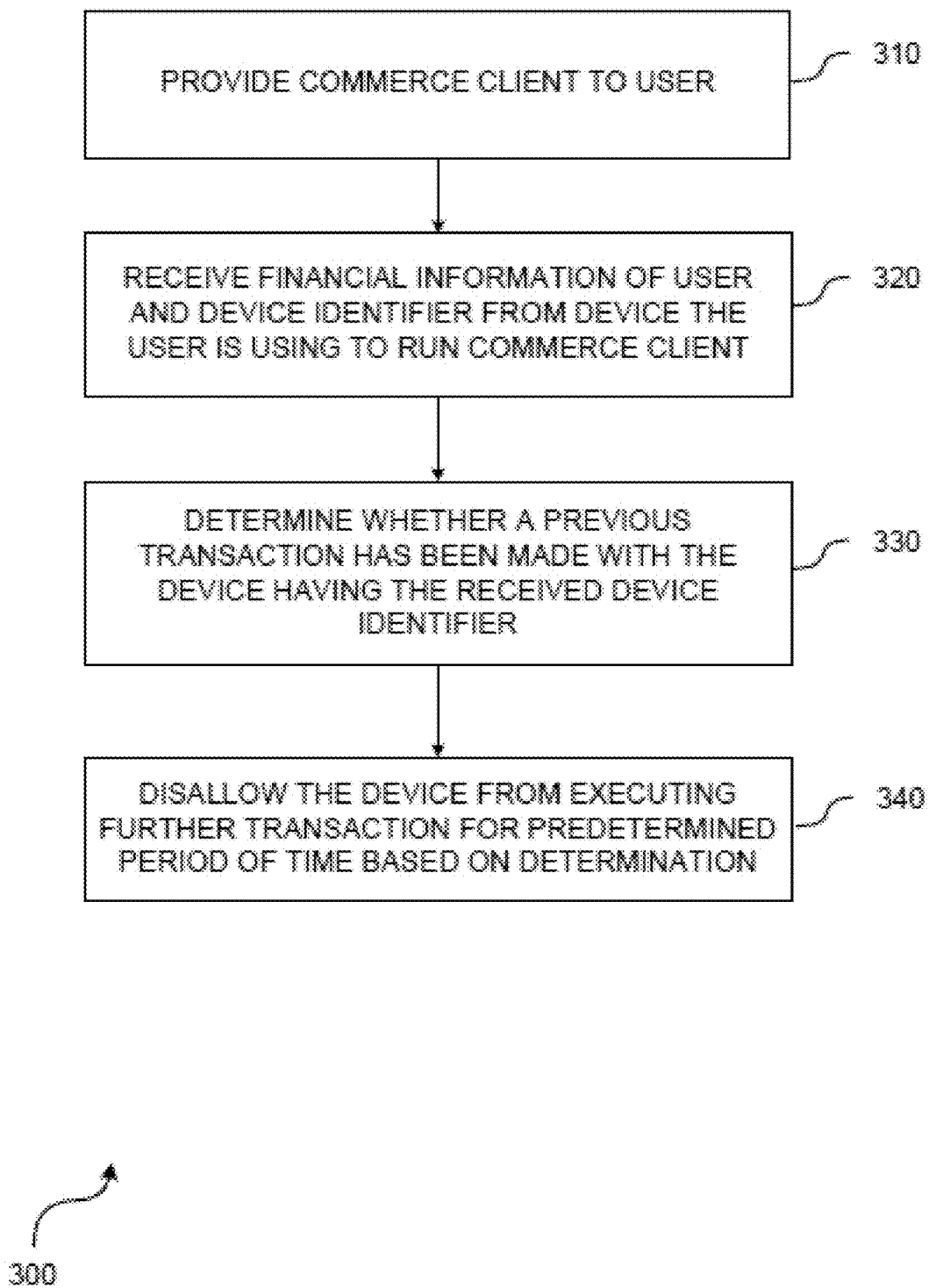
FIG. 3 illustrates an exemplary operational flow diagram of the method for restricting multiple online purchases according to one or more embodiments of the present invention.

FIG. 3 illustrates an example process flow of a method 300 for restricting multiple online purchases according to one embodiment of the present invention. Referring now to FIG. 3, method 300 starts at step 310 where a commerce client is provided to the user. The commerce client may be distributed using a physical medium similar to medium 105. Alternatively, the commerce client may be distributed digitally or made available for download. The commerce client may be a standalone application or it could be a software module within another software application such as Internet Explorer.

At step 320, the financial information of the user and the device identifier of the device being used to make the transaction are received at the commerce server. The device identifier may be generated by the commerce server using one or more of user-configurable and non-user-configurable parameters of the user's device.

At step 330, the commerce server determines whether a previous transaction has been made using the received device identifier. If a previous transaction is found and it is recent, the user's device may be disallowed to make any purchase on the commerce server, as shown in step 340. In this way, no user may purchase a ticket or item over and over again for items with a purchase restriction. In one embodiment, the device is disallowed to execute any new transaction with the commerce server for a predetermined amount of time. The time period may be hours, days, weeks, or months. Alternatively, the time period may be until an event has occurred, such as the date of the event has already passed.

In one embodiment, the commerce server compares the device identifier with the transaction identifier prior to disallowing the device from proceeding with the transaction. For example, if a device has been determined to have made a past and recent transaction, but the current transaction involves a sporting event and the past transaction was for a concert, then the device will be allowed to proceed with the current transaction. If, however, both the past and recent transactions have the same event identifier, then the current transaction will be disallowed. The transaction identifier may comprise an event identifier, name, date, location, etc. The transaction identifier is generated so that it is unique and that no two events or items of commerce share the same identifier.

Figure 4:
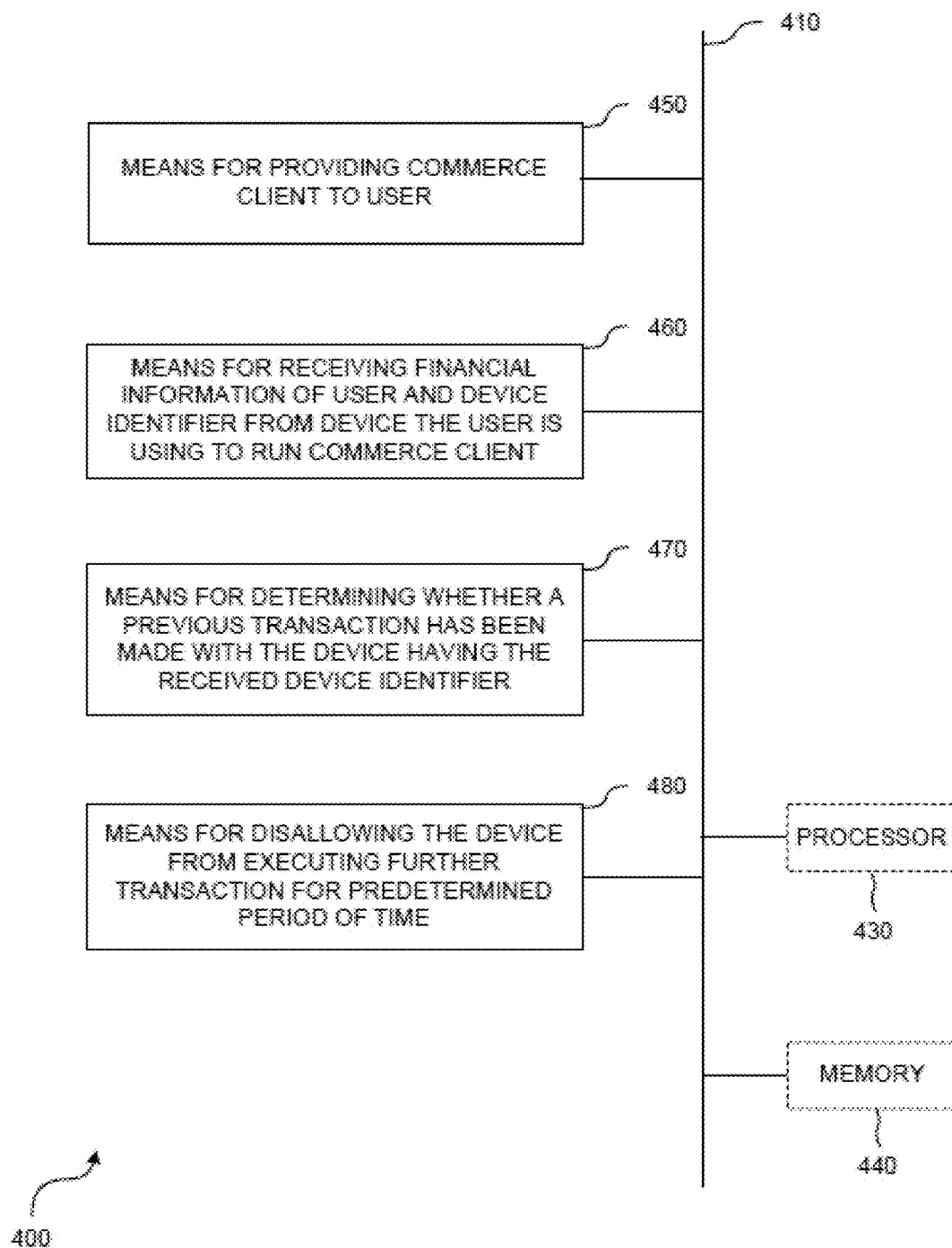
FIG. 4 illustrates an exemplary computing system with which software components can be executed to perform the method for restricting multiple online purchases according to one or more embodiments of the present invention.

In accordance with one or more embodiments of the present invention, there are provided devices and apparatuses for restricting multiple online purchases. With reference to FIG. 4, there is provided an exemplary apparatus 4 that may be configured as either a computing device, or as a processor or similar device for use within a computing device. As illustrated, apparatus 400 may include: a means 450 for providing a commerce client to a user; a means 460 for receiving a financial information of the user and a device identifier from a device the user is using to run the commerce client; a means 470 for determining whether a previous transaction has been made with the device having the received device identifier; and means 480 for disallowing the device from executing further transaction for a predetermined period of time.

It is noted that apparatus 400 may optionally include a processor module 430 having at least one processor, in the case of apparatus 400 configured as computing device, rather than as a processor. Processor 430, in such case, may be in operative communication with means 450-480, and components thereof, via a bus 410 or similar communication coupling. Processor 430 may effect initiation and scheduling of the processes or functions performed by means 450-480, and components thereof.

In further related aspects, apparatus 400 may optionally include a means for storing information, such as, for example, a memory device/module 440. Computer readable medium or memory device/module 440 may be operatively coupled to the other components of apparatus 400 via bus 410 or the like. The computer readable medium or memory device 440 may be adapted to store computer readable instructions and data for effecting the processes and behavior of means 450-480, and components thereof, or processor 440 (in the case of apparatus 400 configured as a computing device) or the methods disclosed herein.

In yet further related aspects, the memory module 440 may optionally include executable code for the processor module 430 to: (a) provide a commerce client to a user; (b) receive a financial information of the user and a device identifier of the device executing the commerce client; (c) determine whether a previous transaction was made using the device having the same device identifier; and (d) disallow the device from proceeding with the current transaction for a predetermined amount of time if the device has recently made similar transaction. One or more of steps (a)-(c) may be performed by processor module 430 in lieu of or in conjunction with the means 450-480 described above.

While the present invention has been illustrated and described with particularity in terms of preferred embodiments, it should be understood that no limitation of the scope of the invention is intended thereby. Features of any of the foregoing methods and devices may be substituted or added into the others, as will be apparent to those of skill in the art. It should also be understood that variations of the particular embodiments described herein incorporating the principles of the present invention will occur to those of ordinary skill in the art and yet be within the scope of the invention.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

It is understood that the specific order or hierarchy of steps in the processes disclosed herein in an example of exemplary approaches. Based upon design preferences, it is understood that the specific order or hierarchy of steps in the processes may be rearranged while remaining within the scope of the present disclosure. The accompanying method claims present elements of the various steps in sample order, and are not meant to be limited to the specific order or hierarchy presented.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical discs (e.g., compact disc (CD), digital versatile disc (DVD), etc.), smart cards, and flash memory devices (e.g., Erasable Programmable Read Only Memory (EPROM), card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

What is claimed is:

1. A method for preventing redundant purchases of limited items, the method comprising the following steps:
   providing a commerce client to a device;
   receiving financial information of a user from the commerce client;
   electronically sampling a physical, non-user-configurable parameter of the device;
   generating, by the commerce client, a device identifier from the device the user is using to run the commerce client, the device identifier being generated by the commerce client running on the device and being based on at least the physical, non-user-configurable parameter of the device;
   receiving the device identifier from the commerce client;
   storing the device identifier on a commerce server remote to the device;
   determining that a previous transaction has been made with the device associated with the received device identifier; and
   disallowing the device from executing further transactions with the commerce server for a predetermined period of time;
   wherein the non-user-configurable parameter comprises a sampling of degradation of the device; and
   wherein the sampling of degradation of the device comprises measuring how fast electricity travels through carbon of the device.

2. The method of claim 1, wherein the commerce client is configured to allow the device to perform a commercial transaction with the commerce server.

3. The method of claim 1, further comprising the steps of:
   receiving information unique to an item of commerce from the commerce client; and
   generating, by the commerce client, a current transaction identifier based on the information unique to the item of commerce, wherein the step of disallowing the device from executing further transactions comprises disallowing the device from executing further transactions when the previous transaction has a same event identifier as the current transaction identifier.

4. The method of claim 3, wherein the previous transaction has a previous transaction identifier that is different than the current transaction identifier.

5. The method of claim 3, wherein the current transaction identifier comprises at least one of an event name, a location, and a date.

6. The method of claim 1, wherein the device identifier is further generated by the commerce client based on at least one user-configurable parameter of the device selected from the group consisting of a hard disk volume name, user name, device name, user password, and hard disk initialization date for the device.

7. The method of claim 1, wherein the device identifier is further generated by the commerce client based on at least one irreversible transformation of the non-user-configurable parameter of the device.

8. An apparatus for preventing redundant purchases of limited items, the apparatus comprising:
   means for providing a commerce client to a user device;
   means for receiving financial information of a user from the commerce client;
   means for electronically sampling a physical, non-user-configurable parameter of the user device;
   means for generating, by the commerce client, a device identifier from the user device the user is using to run the commerce client, the device identifier being generated by the commerce client running on the user device and based on the sampling of the physical, non-user-configurable parameter of the user device;
   means for receiving the device identifier from the commerce client;
   means for storing the device identifier on a commerce server remote to the user device;
   means for determining whether a previous transaction has been made with the user device associated with the received device identifier; and
   means for disallowing the user device from executing further transactions with the commerce server for a predetermined period of time;
   wherein the non-user-configurable parameter comprises a sampling of degradation of the user device; and
   wherein the sampling of degradation of the user device comprises measuring how fast electricity travels through carbon of the user device.

9. The apparatus of claim 8, wherein the apparatus further comprises a means for transmitting the device identifier to an online ticket server.

10. The apparatus of claim 8, wherein the means for storing the device identifier comprises storage of the device identifier in a hidden directory of the user device.

11. The apparatus of claim 8, wherein the means for generating the device identifier uses a cryptographic hash function to irreversibly transform at least one input parameter to a portion of the device identifier.

12. The apparatus of claim 8, wherein the device identifier comprises a variable key portion and a system key portion.

13. The apparatus of claim 12, wherein the means for generating the device identifier comprises generating the variable key portion as a function of system time information at a time of registration of the user device.

14. The apparatus of claim 12, wherein the means for generating the device identifier comprises generating the system key portion as a function of at least one of a hard disk volume name, a user name, a computer name, a user password, and a hard disk initialization date.

15. The apparatus of claim 8, wherein the physical, non-user-configurable parameter comprises a sampling of small device failures.

16. A non-transitory computer readable medium having stored thereon computer executable instructions that, upon execution by a computing device, cause the computing device to perform a method comprising:
   providing a commerce client to a user;
   receiving financial information of the user;
   sampling physical, non-user-configurable parameters of the computing device;

generating a device identifier from the computing device the user is using to run the commerce client, the device identifier being generated by the commerce client running on the computing device and being based on the sampling of physical, non-user-configurable parameters of the computing device;

storing the device identifier in a hidden directory of the computing device;

determining whether a previous transaction has been made with the computing device associated with the generated device identifier; and disallowing the computing device from executing further transactions for a predetermined period of time;

wherein the non-user-configurable parameters comprise a sampling of degradation of the computing device; and wherein the sampling of degradation of the computing device comprises measuring how fast electricity travels through carbon of the computing device.

17. The non-transitory computer readable medium of claim 16, wherein the sampling of degradation of the computing device comprises measuring values for damaged sectors of the computing device.

* * * * *